United States Patent
Defaisse

(10) Patent No.: US 10,875,270 B2
(45) Date of Patent: Dec. 29, 2020

(54) TIRE VULCANIZING MOLD WITH OPTIMIZED CLOSING

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Christian Defaisse, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 376 days.

(21) Appl. No.: 15/328,728

(22) PCT Filed: Jul. 21, 2015

(86) PCT No.: PCT/EP2015/066636
§ 371 (c)(1),
(2) Date: Jan. 24, 2017

(87) PCT Pub. No.: WO2016/012443
PCT Pub. Date: Jan. 28, 2016

(65) Prior Publication Data
US 2017/0225418 A1     Aug. 10, 2017

(30) Foreign Application Priority Data

Jul. 25, 2014 (FR) ..................................... 14 57203

(51) Int. Cl.
*B29D 30/06* (2006.01)

(52) U.S. Cl.
CPC ..... *B29D 30/0605* (2013.01); *B29D 30/0629* (2013.01)

(58) Field of Classification Search
CPC .................. B29D 30/0605; B29D 30/0629
See application file for complete search history.

(56) References Cited

U.S. PATENT DOCUMENTS

| 569,909 A | * | 10/1896 | Atwood | ................... B41J 29/44 |
| | | | | 400/707.4 |
| 1,600,586 A | * | 9/1926 | Hatfield | ............. B29D 30/0629 |
| | | | | 425/46 |

(Continued)

FOREIGN PATENT DOCUMENTS

| BE | 751554 A1 | * | 11/1970 |
| DE | 1187364 | * | 2/1965 |

(Continued)

OTHER PUBLICATIONS

Machine translation of Leonh (DE 1187364) from ESPACENET (Year: 2020).*

*Primary Examiner* — Robert C Dye
*Assistant Examiner* — Guy F Mongelli
(74) *Attorney, Agent, or Firm* — Dickinson Wright PLLC; Steven Hurles

(57) ABSTRACT

The tire vulcanizing mould includes a plurality of segments for molding the outside of the tire tread. The segments are able to move radially between a position in which the mold is open and a position in which the mold is closed. The segments have frustoconical bearing surfaces that are placed radially on the outside. An axially mobile external ring, which acts on the frustoconical bearing surfaces, is placed radially on the outside of the segments in order to cause them to close and to move back from their position of (Continued)

closure in the mold. The external ring is radially preloaded towards the inside when the mold is in the open position.

6 Claims, 1 Drawing Sheet

(56) References Cited

U.S. PATENT DOCUMENTS

| | | | | | |
|---|---|---|---|---|---|
| 3,396,221 | A | * | 8/1968 | Paul Musch | B29D 30/0605 264/315 |
| 3,464,090 | A | * | 9/1969 | Cantarutti | B29D 30/0605 264/315 |
| 3,741,696 | A | * | 6/1973 | Greenwood | B29D 30/0629 425/47 |
| 3,797,979 | A | * | 3/1974 | Greenwood | B29D 30/0629 425/47 |
| 3,817,670 | A | * | 6/1974 | Leblond | B29D 30/0605 425/46 |
| 3,922,122 | A | * | 11/1975 | Bottasso | B29D 30/0605 425/46 |
| 4,580,959 | A | * | 4/1986 | Pizzorno | B29D 30/0605 425/47 |
| 4,653,992 | A | * | 3/1987 | Baraldi | B29D 30/54 425/17 |
| 4,828,471 | A | * | 5/1989 | Schlautmann | B29D 30/0629 425/29 |
| 4,871,305 | A | * | 10/1989 | Galigani | B29D 30/0605 425/35 |
| 4,931,004 | A | | 6/1990 | Fogarasi et al. | |
| 5,141,424 | A | * | 8/1992 | Christof | B29D 30/0629 425/28.1 |
| 5,234,326 | A | * | 8/1993 | Galli | B29C 33/10 425/46 |
| 5,290,163 | A | * | 3/1994 | Katsumata | B29C 35/02 264/347 |
| 5,492,464 | A | * | 2/1996 | Irie | B29D 30/0629 425/29 |
| 5,589,200 | A | * | 12/1996 | Irie | B29D 30/0605 264/334 |
| 5,814,263 | A | * | 9/1998 | Pouille | B29D 30/0629 425/46 |
| 6,949,213 | B1 | * | 9/2005 | Kata | B29D 30/0629 264/326 |
| 8,007,710 | B2 | * | 8/2011 | Marchini | B29C 43/021 264/326 |
| 2003/0140997 | A1 | * | 7/2003 | Suzuki | B29C 33/42 152/209.3 |
| 2003/0141629 | A1 | * | 7/2003 | Girard | B29D 30/0629 264/326 |
| 2007/0042065 | A1 | * | 2/2007 | Matsumoto | B29C 33/202 425/47 |
| 2007/0254056 | A1 | * | 11/2007 | Ogawa | B29D 30/0629 425/35 |
| 2009/0035404 | A1 | * | 2/2009 | Hana | B29D 30/0629 425/36 |
| 2009/0160098 | A1 | * | 6/2009 | Currie | B29C 35/02 264/347 |
| 2009/0174122 | A1 | * | 7/2009 | Mancini | B29D 30/0605 425/46 |
| 2010/0140847 | A1 | * | 6/2010 | Secchi | B29D 30/0605 264/334 |
| 2010/0219559 | A1 | * | 9/2010 | Sano | B29D 30/0629 264/241 |
| 2011/0104317 | A1 | * | 5/2011 | Owen | B29D 30/0605 425/47 |
| 2012/0177763 | A1 | * | 7/2012 | Aperce | B29D 30/0629 425/46 |

FOREIGN PATENT DOCUMENTS

| | | | | |
|---|---|---|---|---|
| DE | 101610 | * | 12/1973 | |
| DE | 101610 A | * | 12/1973 | |
| DE | 2315461 A1 | * | 10/1974 | B29D 30/0629 |
| DE | 2529901 A1 | * | 6/1977 | B29D 30/0605 |
| EP | 0569909 A1 | * | 11/1993 | B60C 11/0306 |
| EP | 1647383 A1 | * | 4/2006 | B29C 33/202 |
| EP | 1647383 A1 | | 4/2006 | |
| FR | 2195521 A1 | * | 3/1974 | B29D 30/0629 |
| GB | 1039049 | * | 8/1966 | |
| JP | 2004314606 A | * | 11/2004 | B29D 30/0629 |
| WO | 9324309 A1 | | 12/1993 | |

* cited by examiner

TIRE VULCANIZING MOLD WITH OPTIMIZED CLOSING

CROSS-REFERENCE TO RELATED APPLICATION

The present invention claims priority to PCT International Patent Application Serial No. PCT/EP2015/066636 filed Jul. 21, 2015 entitled "Tire Vulcanizing Mould With Optimized Closing," which claims the benefit of FR Patent Application Serial No. 1457203 filed Jul. 25, 2014, the entire disclosures of the applications being considered part of the disclosure of this application and hereby incorporated by reference.

BACKGROUND OF THE INVENTION

1. Field of the Invention

The invention relates to the field of tire manufacture and more particularly to the field of moulds intended for vulcanization.

2. Related Art

As is known in the tire-building industry, the moving parts of the curing mold form a rigid chamber intended to mold the external part of the tire and to transmit to the tire the heat energy required for the vulcanization reaction.

This chamber as a general rule comprises two plates moving axially and supporting shells which are intended to mold the sidewalls of the tire. Resistant arc-shaped segments moving in the radial direction each bear a molding element intended to mold the tread. The various parts of the mold are assembled and moved with suitable kinematics in relation to the curing press.

In order to close the segments radially onto the green tire, use is generally made of an axially mobile external ring which acts on frustoconical bearing surfaces of the segments. When the mold is in the closed position, the ring bears against the radially external back of the segments and keeps the molding elements pressed together. The shells are moved axially closer together and on each of the axially opposite faces bear molding elements so as to form a continuous internal molding surface. When the mold is opened, the segments retreat radially under the action of the ring, and the plates are moved axially further apart in order to allow the tire to be extracted from the vulcanization chamber.

The curing press controls not only the radial movement of the segments but also the opening and closing movement of the mold and has therefore to have a robust structure and provide significant force notably in order to keep the mold closed while the tire is being cured, which is done at high pressure. During curing, the pressure inside the mold has a tendency to push the segments apart, and this has a negative impact on the quality of the molding (for example creating flash between the segments during molding). In order to guarantee that the mold remains closed especially at high pressures, the force applied by the press needs to be adapted to suit the pressure inside the tire, and this entails the use of a press that is bulky and expensive or alternatively of a press for each mold, something which proves to be even less economical.

One solution to this problem has been described in document U.S. Pat. No. 3,922,122 in which the ring that closes the molding segments bears against the lower plate of the press by means of height-adjustable rigid washers. The height of the washers is chosen so that when the mold is being closed when the segments are brought into contact with the ring, forces situated at the interface between the ring and the segments cause elastic deformation applied to the segments. These forces that create the elastic deformation of the segments oppose the outward radial movements brought about by the pressure inside the mold and ensure that the segments remain in the closed position. However, the washers need to be adjusted in height each time the mould is changed, and this has an effect on productivity.

Another solution has been described in document EP 1 647 383, in which the ring that closes the segments is mounted on the upper plate of the vulcanization press by means of spring-washer boxes distributed about its circumference. In operation, the washers in the boxes compress as the mold is being closed, thereby allowing adaptation of the clamping force through elastic deformation of the closure ring. The ring deforms elastically and lengthens in the direction of the force coming from the elastic boxes in each curing cycle.

In the solutions known from these documents, the forces used to stress the washers in each cycle are additional forces that need to be provided by the curing press. What is more, the stresses on the mold closure components occur each curing cycle and such cyclic stresses induce fatigue wear in the components and have a negative impact on mold life.

SUMMARY OF THE INVENTION AND ADVANTAGES

It is an object of the disclosure to provide a mold capable of overcoming these disadvantages while at the same time being able to operate with lower forces provided by the vulcanizing press.

The object of the disclosure is achieved using a tire vulcanizing mold comprising
  a plurality of segments for molding the outside of the tire tread and which are able to move radially between a position in which the mold is open and a position in which the mold is closed, these segments having frustoconical bearing surfaces placed radially on the outside, and
  an axially mobile external ring which acts on the frustoconical bearing surfaces placed radially on the outside of the said segments in order to cause them to close and to move back from their position of closure in the mold.

The external ring is radially preloaded towards the inside when the mold is in the open position.

Thus, a permanent preload is applied to the external ring as it is being manufactured. It is possible, for example, to produce a ring in the form of an assembly of two components that are a tight fit. The preload imparted to the external ring is directed radially towards the inside of the mold to oppose the forces generated at the interface with the segments by the internal pressure in the curing chamber thereof. Thus, for the same internal pressure, the press needs to provide a closure force that is lower than the force needed in the solutions known from the prior art.

Advantageously, the external ring is a shrink-fit assembly, for the ease of creation and for the robustness qualities of the shrink-fitted assembly.

For preference, the shrink-fit pressure is higher than the internal curing pressure. By way of example, it is comprised between 4 and 6 N/mm$^2$. This makes it possible to provide a sufficient preload force for the ring of the curing mold while at the same time preventing the band from bursting.

In a first embodiment of the disclosure, the mold comprises a rigid cylindrical tube shrink-fitted around the said ring. This solution is simple to implement, for example by heating the tube before mounting it on the ring.

In an alternative form of the disclosure, the mold comprises a taut cable wound around the said ring. This allows the cable to be wound over a given height and in a predetermined pattern. The advantage of this solution is that it is possible to provide high forces using a cable that is of low weight.

For preference, the angle of inclination of the said frustoconical bearing surface of the external ring is comprised between 6° and 20°. During laboratory testing, it was found that, for an angle less than 6°, the assembly becomes wedged, and that, upwards of 20° the vertical component of the force due to the internal pressure becomes very high.

In a second embodiment of the disclosure, stress is imparted to the external ring by creating a cone-to-cone assembly. This offers the advantage of feasibility without the need to heat one of the components.

For preference, the angle of inclination of the cone is comprised between 3 and 25° so as to re-impart a maximum of force via the cone to the external ring of the mold, bearing in mind the coefficient of friction at the interface between the two conical components of the assembly.

Advantageously, the mold comprises a means for adjusting the amount of preload. This allows the amount of preload to be adjusted according to the internal pressure of the mold.

For preference, the mold comprises two plates moving axially and supporting shells, which are intended to mold the sidewalls of the tire. Admittedly, it is possible to apply the solution of the disclosure to a mold for retreading a tire which then does not have lateral shells intended to mold the sidewalls of the tire. In a preferred alternative form of the disclosure, the mold is a mold for creating a tire from a green tire blank enclosed inside a vulcanizing mold.

The objects of the disclosure are also achieved using a method for molding a green tire using a mold of the disclosure, in which a preload is applied to the external ring before the mold is closed.

BRIEF DESCRIPTION OF THE DRAWINGS

The disclosure will be better understood by virtue of the remainder of the description, which is supported by the following figures.

DETAILED DESCRIPTION OF THE ENABLING EMBODIMENTS

Figure 1:
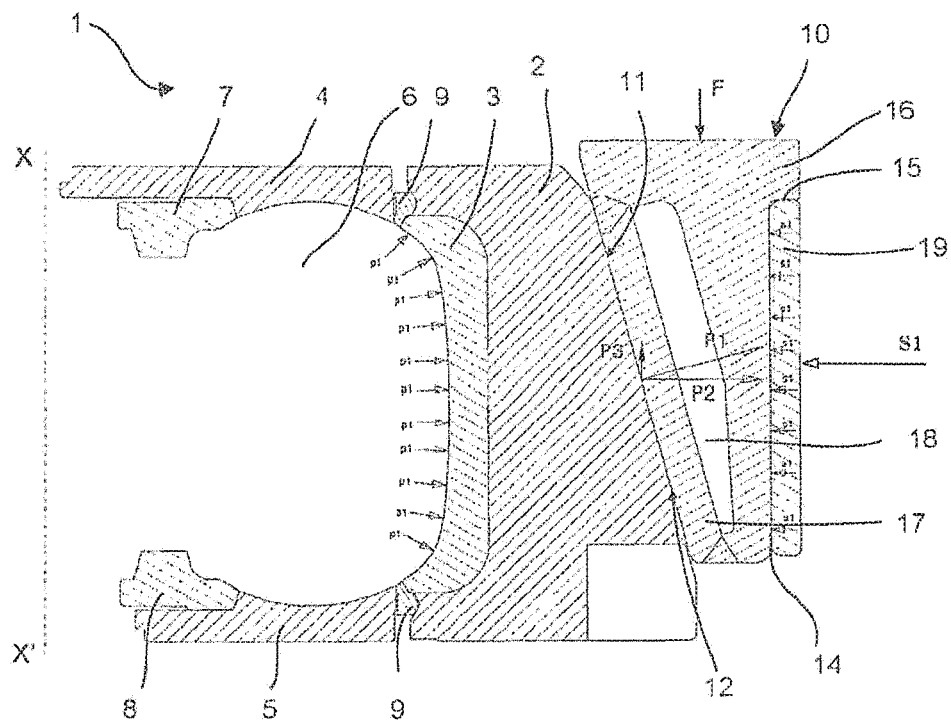
FIG. 1 is a view in cross section of the mold according to a first embodiment of the disclosure, the cross section being taken on a vertical plane that passes through the axis of symmetry of the mold.

The mold 1 comprises segments 2 comprising molding elements 3 for molding the radially external surface of the tread and which delimit, with an upper shell 4 and a lower shell 5 an internal cavity 6. The upper shell 4 and the lower shell 5 are each supplemented by a part intended to mold the bottom region of the green tire 7 and 8 respectively. The molding elements 3 are fixed to the segments 2 by snap rings 9. The shells 4 and 5 are each secured to an upper plate and to a lower plate of the press (the plates are not illustrated), which move relative to one another in the axial direction. The mold thus formed exhibits symmetry of revolution about the axis X-X'.

When the mold 1 is in the closed position, as illustrated in FIG. 1, the molding elements 3 are arranged circumferentially in close contact with each of the shells to form a continuous molding surface. A curing membrane is arranged in the internal cavity 6 and, by means of a heat-transfer fluid, provides the conditions of temperature T1 and curing pressure p1 for curing the green tire arranged inside the mold 1 and pressed firmly by the curing membrane against the molding parts thereof. By way of example, the temperature T1 is comprised between 120 and 160° C. and the pressure p1 between 16 and 24 bar (1.6 and 2.4 $N/mm^2$).

An external ring 10 radially on the outside with respect to the segments 2 is mounted with the ability to move axially (understood to mean along the axis X-X' or parallel thereto), it has a frustoconical internal surface 12 which engages with the frustoconical external bearing surfaces 11 of the segments 2. The external ring 10, radially on the outside with respect to the segments 2 and with the ability to move axially, causes the segments 2 to close by engaging with the frustoconical bearing surface radially on the outside of the segments. The external ring 10 is made to move, for example, by means of an actuating cylinder (not depicted) with an adjustable application force F.

According to the disclosure, a preload S1, oriented radially towards the inside of the mold 1, is applied to the external ring 10. This preload is permanent and is obtained at the time of manufacture of the ring. In the embodiment of FIG. 1, a cylindrical tube 19 is shrink-fitted in the hot state around the external ring 10. The cylindrical tube 19 is heated and fitted in the hot state over the peripheral or shrink-fitting surface 14 of the body 16 of the external ring 10 until it comes into abutment with a shoulder 15 thereof.

Figure 2:
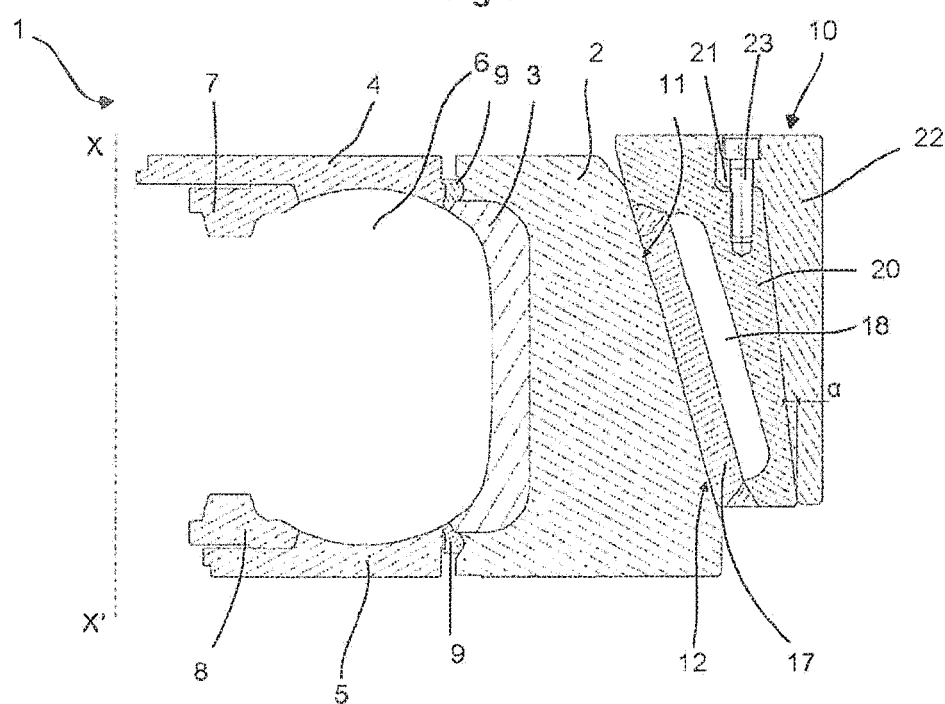
FIG. 2 is a view in cross section of the mold according to a second embodiment of the disclosure, the cross section being taken on a vertical plane that passes through the axis of symmetry of the mold.

In the examples illustrated in the figures, the ring is of the heated ring type and contains pressurized steam. The external ring 10 of FIG. 1 is thus created by assembling a body 16 that has a cylindrical external surface 14 and a frustoconical sleeve 17 welded to the body 16, a chamber for the circulation of heat-transfer fluid 18 being formed between the two. Similarly, the external ring 10 illustrated in FIG. 2 is created by welding together a body 20 and a frustoconical sleeve 17 defining a chamber for the circulation of heat-transfer fluid 18 between the two.

In the example illustrated, the cylindrical tube 19 has a thickness of 15 mm and the external ring has an external diameter of the shrink-fitting surface 14 of 957 mm at ambient temperature. When a shrink-fit tube made of steel and a tensile stress of 150 $N/mm^2$ are chosen, a pre-heating band diameter of 956.3 mm is obtained, which will be easy to fit over the ring when heated to a temperature of around 180° C.

In an alternative form, the external ring 10 is cooled using liquid nitrogen or dry ice in order to shrink it and fit it inside the cylindrical tube 20.

In another alternative form of the disclosure, the external ring 10 is shrink-fitted by winding a taut metal cable around the shrink-fitting surface 14 of the ring. The cable is wound in a helix at a determined pitch over all or part of the height of the said shrink-fitting surface 14. Individual annular hoops may also be created so that they are uniformly distributed over the height of the shrink-fitting zone 14. The shrink-fitting pressure needs to be comprised between 4 and 6 $N/mm^2$.

In another alternative form, resin-coated wires may be used in place of the metal cables.

FIG. 2 illustrates the mold 1 according to a second embodiment of the disclosure, in which elements similar to those of FIG. 1 have kept the same reference numeral. As can be seen in FIG. 2, stress is imparted to the external ring 10 by producing a cone-to-cone assembly in which the cones are moved using an adjusting screw. To do that, the external ring 10 comprises a body 20 having a frustoconical external surface with angle of inclination α. A frustoconical annulus 22 having an internal surface inclined by the same angle α as the body 20 is fitted over the external surface of the latter.

The body 22 has a protruding part 21 which fits over a part of corresponding shape belonging to the body 20, the body 20 and the annulus 22 being fixed together using a screw 23. The screw 23 is used to adjust the axial position of the annulus 2 with respect to the body 20 and therefore to adjust the amount of preload applied to the ring 10

By way of example, the body 16, 22 of the external ring 10 is made of a steel that can be welded, such as 25CrMo4, having the following characteristics at ambient temperature: a minimum tensile strength of 460 N/mm², a minimum elastic limit of 250 N/mm² and an elongation at break in excess of 14%. The same is true of the material of the sleeve 17 which, in addition, has a nitriding treatment of its frustoconical surface which collaborates with that of the segments 2. The cylindrical tube 19 and the frustoconical annulus 22 are made from a steel having mechanical properties equivalent to those of the body of the external ring 10.

The way in which the mold 1 works is as follows: having placed a green tire inside the internal cavity 6, the mold 1 is closed through a progressive advancing movement of the external ring 10 due to the closure force F coming from the press. The frustoconical internal surface 11 of the ring progressively engages with the frustoconical bearing surfaces 12 of the segments 2, which causes the segments and the internal cavity of the mold 1 to close through axial movement of the upper plate of the press. When the mold 1 is opened, the external ring 10 advances axially and the segments 2 retreat radially and are then driven axially at the same time as the upper plate in order to move away from the lower plate.

FIG. 1 illustrates the mold 1 in the closed position during the vulcanization operation. The resultant of the forces due to the internal pressure p1, which is the pressure that the curing membrane in exerts on the green tire, at the interface between the ring and the segments, is represented as P1 in FIG. 1. The resultant P1 has a horizontal component P2 and a vertical component P3. The clamping force F of the press needs to be higher than the vertical component P3 in order for the mold 1 to remain closed during curing. The direction of the force S1 supplied by the preload of the ring 10 is the opposite of that of the force P2 due to the internal pressure of the mold 1. This prevents the segments from opening up during vulcanization, thereby preventing molding defects from occurring on the tire. What is more, the clamping force F supplied by the press is lower, because it needs to overcome only the force P3.

The embodiments described hereinabove are of course nonlimiting and a person skilled in the art will be able to envisage other equivalent means that allow stress to be imparted to the external ring of the mold 1. Thus, in place of the shrink-fitted cylindrical tube it is possible to use a split cylindrical tube combined with means of circumferential clamping around the external surface of the ring.

It is moreover possible to envisage an assembly using several successive bands which may be identical or different.

The solution of the disclosure is just as applicable to the molds used for manufacturing tires as it is to annular treads for the retreading of tires.

The invention claimed is:

1. A tire vulcanizing mold comprising:
a plurality of segments for molding an outside of a tire tread and which are able to move radially between a position in which the mold is open and a position in which the mold is closed, these segments having frustoconical bearing surfaces disposed on radially outer surfaces of the segments,
an axially mobile external ring assembly disposed radially outside of the plurality of segments, the axially mobile external ring assembly including a body that surrounds the plurality of segments and which acts on the frustoconical bearing surfaces of the segments in order to cause them to close and to move back from their position of closure in the mold, and
the axially mobile external ring assembly further including a preload device which is a separate piece from the body and which surrounds the body and which imparts a radially inward preload force on the body both when the mold is in the open position and when the mold is in the closed position, and
the preload device being in the form of a cylindrical tube that is shrink-fitted over a peripheral surface of the body and into abutment with a shoulder on the body.

2. The tire vulcanizing mold according to claim 1, wherein a shrink-fitting pressure of the shrink-fitted tube that is directed radially inward is greater than an internal curing pressure of the mold that is directed radially outward.

3. The tire vulcanizing mold according to claim 1, wherein an angle of inclination of the frustoconical bearing surface is between 6 and 20°.

4. The tire vulcanizing mold according to claim 1, further including two plates that are movable axially and supporting shells intended to mold sidewalls of the tire.

5. A method for moulding a tire using a mold according to claim 1, including the step of applying a preload to the external ring before the mold is closed.

6. A tire vulcanizing mold comprising:
a plurality of segments for molding a tire tread, wherein the segments are moveable in an inward radial direction toward an axis and in an outward radial direction away from an axis, wherein the mold has an open position and a closed position, wherein in the closed position the plurality of segments contact each other and in the open position the plurality of segments are disposed radially outward relative to the closed position;
wherein the segments include radially outer frustoconical surfaces;
a ring moveable in an axial direction, wherein the ring is moveable between a first axial position and a second axial position that is different than the first axial position, the ring having a radially inner frustoconical surface which acts on the radially outer frustoconical surfaces of the plurality of segments when the mold is in the closed position and the ring is in the first axial position;
wherein a preload device in the form of a cylindrical tube imparts a preload force on the ring in a radially inward direction with a first load when the mold is in the open position and the ring is in the second axial position, the preload device abutting a shoulder on the ring and being shrink-fitted over a portion of the ring;
wherein when the mold is in the closed position and the ring is in the first axial position, the first load is applied to the radially outer frustoconical surfaces of the plurality of segments and the ring circumferentially surrounds the plurality of segments.

* * * * *